Patented Feb. 19, 1935

1,991,809

UNITED STATES PATENT OFFICE 1,991,809

METHOD FOR PRODUCING SILK-LIKE LUSTER BY COATING

Leon Lilienfeld, Vienna, Austria

No Drawing. Application March 7, 1931, Serial No. 521,024. In Great Britain March 14, 1930

10 Claims. (Cl. 8—20)

When a vegetable textile material, for example a fabric or yarn is impregnated or coated with a solution of a cellulose ether or of a cellulose xanthic acid ester or of an N-substituted thiourethane of cellulose, it acquires an attractive luster or shine, but at the same time, a stiff, paper-like feel.

The present invention is based on the discovery that vegetable textile materials coated or impregnated with a solution of a cellulose ether or of a cellulose xanthic acid ester or of an N-substituted thiourethane of cellulose, acquire a very attractive luster and do not lose, or lose only part of their original softness, if the impregnated or coated materials are acted upon with an agent or agents adapted to cause the textile materials to shrink. The cellulose ethers used in the process may be simple ethers such as alkyl ethers or aralkyl ethers, (e. g. ethyl cellulose ether or benzyl cellulose ether) or they may be mixed cellulose ethers such as the alkyl-aralkyl cellulose ethers of cellulose. The shrinking, of course, must take place while the textile material is not under a sufficient tension to prevent shrinking.

I have further discovered that, in some cases, it is advantageous to use pyridine as the solvent for the aforementioned cellulose compounds. In all cases in which the selected cellulose compound is insoluble in pure pyridine, but only soluble in aqueous pyridine, aqueous pyridine, for example a mixture of 70 parts of pyridine and 30 parts of water or a mixture of 80 parts of pyridine and 20 parts of water or a mixture of 90 parts of pyridine and 10 parts of water, is to be used.

Finally, I have also obtained a further satisfactory improvement by incorporating with the cellulose ethers or cellulose xanthic acid esters or N-substituted thiourethanes of cellulose one or another of the substances which can be obtained in accordance with U. S. Patent 1,018,329 and I consider such addition a distinct advantage. The said patent relates in particular to the production of 2 oxytrimethylene 1:3 sulphide and its isomer 3 oxytrimethylene 1:2 sulphide, and their polymers. These bodies are quite different from many of the other known sulphur derivatives of glycerine, in that while the latter are characterized by a disagreeable odor and readily soluble in alcohol, the bodies produced by my said patent are almost inodorous and are only very slightly soluble in alcohol.

As illustrative of the production of these sulphur-containing compounds, I give the following matter from said patent.

α or β dichlorhydrine is reacted upon with a solution of sodium sulphide, applied in chemically equivalent amount.

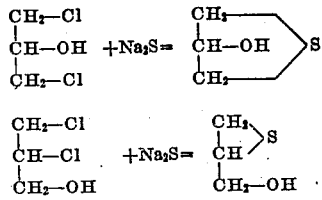

Any other suitable softening agents or plasticizers may be incorporated with the solutions or pastes of the cellulose compounds.

The mode and details of working my improved process will be readily understood by those skilled in the art and the following examples are merely given further to illustrate, how the invention can be put into effect.

Example 1

Cotton sateen which may or may not be calendered and/or schreinered is coated with a 7 per cent. solution of a cellulose ethyl ether in a mixture of 2 parts of benzol and 1 part of alcohol of 95 per cent. strength, whereupon, without being dried, the cloth is introduced into a caustic soda solution of 50 per cent. strength at 15° C., where it remains for a few minutes. After that time the cloth is brought into sulphuric acid of 10 per cent. strength at 16° C. and then washed and dried.

Example 2

Mode of procedure as in Example 1, but with the difference that, before being contacted with the caustic soda solution, the impregnated fabric is dried at 40° C.

Example 3

Mode of procedure as in Example 1, but with the difference that, instead of a 7 per cent. solution of cellulose ethyl ether, a 10 per cent. solution is used.

Example 4

The process is conducted as in Example 3, but with the exception that, before being contacted with the caustic soda solution, the impregnated cloth is dried at 40° C.

Example 5

The process is conducted as in any of the Examples 1 or 2 or 3 or 4, but with the difference that, instead of the caustic soda solution of 50 per cent. strength, a caustic soda solution of 30 per cent. strength is employed.

Example 6

The process is conducted as in any of the Examples 1 or 2 or 3 or 4, but with the difference that, instead of the caustic soda solution of 50 per cent. strength, a caustic soda solution of 15 to 22,5 per cent. strength is employed.

Example 7

Cotton sateen is coated with an 8 per cent. solution of cellulose ethyl ether in a mixture of 70 parts of pyridine and 30 parts of water, or with an 8 per cent. solution of benzyl ether of cellulose in pure pyridine, dried at 40° C. and thereafter introduced into a caustic soda solution of 15 to 22,5 per cent. strength where it remains for a few minutes, whereupon the material is soured in dilute sulphuric acid, washed and dried.

Example 8

Mode of procedure as in Example 7, but with the exception that, instead of the caustic soda solution of 15 to 22,5 per cent. strength, a caustic soda solution of 50 per cent. strength is used.

Example 9

10 parts of cellulose benzyl ether are dissolved in 90 parts of pure pyridine and cotton sateen is coated with this solution, dried at 40° C., introduced in a caustic soda solution of 15 to 50 per cent. strength, where it remains for a few minutes, soured and then washed and dried.

Example 10

Cotton sateen is coated with an 8 per cent. solution in pyridine solution of 90 per cent. strength of one of the pyridine-soluble cellulose xanthic acid ethyl or methyl esters prepared according to U. S. Patent No. 1,680,224 and dried at 40° C., introduced into a caustic soda solution of 15 to 50 per cent. strength, where it remains for a few minutes, soured and then washed and dried.

Example 11

Mode of procedure as in any one of the Examples 8 to 10, but with the difference that the impregnated cloth is not dried before being introduced into the caustic soda solution.

Example 12

A 3 to 8 per cent. solution of a pyridine-soluble diethyl-, or pentamethylene-, or phenyl-, or methylphenyl-, or α-diphenylene-, or phenylmethyl-, or benzyl-thiourethane of cellulose (prepared for example according to the directions given in my U. S. Patent No. 1,674,401) in an aqueous solution of pyridine of 70 to 90 per cent. strength is used for impregnating a cotton sateen which may or may not be calendered and/or schreinered. The impregnated fabric is, optionally after being dried, introduced into a caustic soda solution of 15 to 22,5 per cent. strength, where it remains for a few minutes, and is then soured, washed and dried.

Example 13

The process is conducted as in Example 12, but with the difference that, instead of a 15 to 22,5 per cent. caustic soda solution, such of 30 to 50 per cent. strength is used.

Example 14

Mode of procedure as in any one of the preceding examples, but with the exception that 50 per cent. (calculated on the weight of the cellulose compound) of 0-tricresylphosphate are added to the solution before coating.

Example 15

Mode of procedure as in any one of the preceding examples, but with the exception that 50 per cent. (calculated on the weight of the cellulose compound) of glycerine are added to the solution before coating.

Example 16

Mode of procedure as in any one of the preceding examples, but with the difference that 50 per cent. (calculated on the weight of the cellulose compound) of di-chlor ether are added to the solution before coating.

Example 17

The process is conducted as in any one of the foregoing examples, but with the difference that 50 to 100 per cent. (calculated on the weight of the cellulose compound) of 2-oxytrimethylene 1:3-sulphide prepared according to the example of my U. S. Patent 1,018,329 (and which has been dried by kneading it with alcohol of 95 per cent. strength several times, then with ether and then drying it under reduced pressure at room temperature) are added to the solution before coating.

Example 18

The process is conducted as in any one of the foregoing examples, but with the difference that 50 per cent. (calculated on the weight of the cellulose compound) of mono- or di-thioglycerine or of mono- or di-thioethylene-glycol are added to the solution before coating.

Example 19

The process is conducted as in any one of the foregoing examples, but with the difference that, instead of the caustic soda solution, a solution of sodium sulphide, for example of 30 to 58 per cent. strength (calculated as $Na_2S.9H_2O$), is employed as shrinking agent.

Example 20

The process is conducted as in any one of the foregoing examples, but with the difference that, after leaving the caustic soda solution or sodium sulphide solution, the cloth is not soured, but directly washed and dried.

Example 21

Mode of procedure as in any one of the foregoing examples, but with the difference that the finished cloth is calendered.

In the solutions of the cellulose compounds intended for coating, a gas, may be dissolved or otherwise dispersed. My copending applications, now Patents No. 1,829,904 and 1,829,905 and 1,829,906, all described the incorporation of a gas, by solution or dispersion, into a solution of a cellulosic compound, which solution is to be used for coating textile materials.

As a matter of course, the cellulose compounds with which the present invention is concerned, may be used in mixtures with one and another, for instance a cellulose ether with a cellulose xanthic acid ester or with an N-substituted thiourethane of cellulose for example by dissolving them in pyridine and using the solution as described in the foregoing examples.

In the foregoing examples the finished fabrics may be schreinered or embossed or beetled.

The treatment of yarn will be understood from the foregoing examples.

The expression "vegetable textile material" in the specification and in the claims includes wherever the context permits, all vegetable fibrous materials, such as flax, linen, hemp, ramie-fibre, jute and particularly cotton and the like, in the form of pure vegetable fabrics (for example pure cotton fabrics) or mixed fabrics or in the form of yarn in skeins, cops, or warps.

What I claim is:—

1. Process for improving vegetable textile materials, which process consists in impregnating the textile materials with a solution of at least one organic cellulose derivative soluble in pyridine of at least 70% concentration, but insoluble in water, said cellulose derivative being water-resistant when deposited from its solution in an organic solvent, and being selected from the herein described group consisting of cellulose ethers, cellulose xanthic acid esters, N-substituted thiourethanes of cellulose, and mixtures thereof, and subjecting the textile materials, after the incorporation of the said cellulose derivative, which derivative itself is resistant to the chemical action of shrinking agents, to a shrinking action by means of a shrinking agent which does not chemically decompose said cellulose derivative or said vegetable textile material.

2. A process as claimed in claim 1, in which the solvent for the cellulose derivative consists in large part at least, of pyridine.

3. Process as claimed in claim 1, wherein the solution of cellulose derivatives also contains a softening agent.

4. Process as in claim 1, in which a sulphur compound, having no strong odor, not readily soluble in alcohol and selected from the herein described group consisting of 2 oxytrimethylene 1:3 sulphide, 3 oxytrimethylene 1:2 sulphide, and their polymerization products, is present in the solution of cellulose derivative, these products serving as softening or plasticizing agents.

5. Process as claimed in claim 1, in which a gas is incorporated into the solution of cellulose derivative employed.

6. As new products, vegetable textile materials impregnated with a cellulose derivative of the herein described group consisting of cellulose ethers, cellulose xanthic acid esters and N-substituted thiourethanes of cellulose, which are insoluble in water but soluble in organic solvents, and which per se are undecomposable by shrinking agents, said vegetable textile material being shrunk, and said product being soft.

7. A process of treating vegetable textile material which comprises first treating such textile material with a solution, in an organic solvent, of an organic compound of cellulose selected from the herein described group consisting of cellulose ethers, cellulose xanthic acid esters and N-substituted thiourethanes of cellulose, said cellulose compound being soluble in such solvent, and thereafter shrinking such textile material in an alkaline shrinking bath.

8. A process of treating vegetable textile material which comprises first treating such textile material with a solution, of an alkyl N-substituted thiourethane of cellulose in an organic solvent therefor, and thereafter shrinking such textile material in an alkaline shrinking bath.

9. A process of treating vegetable textile material which comprises first treating such textile material with a solution, in a solvent consisting of pyridine mixed with less than half its own quantity of water, of an organic compound of cellulose soluble in such solvent, said compound of cellulose being selected from the herein described group consisting of cellulose ethers, N-substituted thiourethanes of cellulose and cellulose xanthic acid esters, and thereafter shrinking such textile material in an alkaline shrinking bath.

10. A process which comprises shrinking, in a bath selected from the herein described group consisting of caustic alkali solution and alkali metal sulphide solution, a vegetable textile fabric dressed with a solution, of an organic compound of cellulose insoluble in water and soluble in pyridine of at least 70% strength, said cellulose compound being selected from the herein described group consisting of cellulose ethers, cellulose xanthic acid esters and N-substituted thiourethanes of cellulose.

LEON LILIENFELD.